United States Patent [19]

Onodera

[11] Patent Number: 5,592,638
[45] Date of Patent: Jan. 7, 1997

[54] STORAGE REGION ASSIGNMENT METHOD IN A LOGICALLY PARTITIONED ENVIRONMENT

[75] Inventor: Osamu Onodera, Hadano, Japan

[73] Assignee: Hitachi, Ltd., Tokyo, Japan

[21] Appl. No.: 90,953

[22] Filed: Jul. 13, 1993

[30] Foreign Application Priority Data

Jul. 14, 1992 [JP] Japan .................................. 4-186648

[51] Int. Cl.$^6$ .................................................. G06F 12/08
[52] U.S. Cl. ........................................ 395/406; 395/497.04
[58] Field of Search ..................................... 395/400, 425, 395/406, 419, 497.01, 497.02, 497.04; 364/927.5; 369/200

[56] References Cited

U.S. PATENT DOCUMENTS

| | | | |
|---|---|---|---|
| 4,300,192 | 11/1981 | Couleur et al. | 369/200 |
| 4,601,012 | 7/1986 | Aiken, Jr. | 395/182.13 |
| 4,757,438 | 7/1988 | Thatte et al. | 369/200 |
| 4,843,541 | 6/1989 | Bean et al. | 364/200 |
| 5,095,427 | 3/1992 | Tanaka et al. | 395/200 |
| 5,210,844 | 5/1993 | Shimura et al. | 395/425 |
| 5,345,590 | 9/1994 | Ault et al. | 395/650 |
| 5,369,750 | 11/1994 | Inoue et al. | 395/400 |
| 5,371,848 | 12/1994 | Casey et al. | 395/161 |
| 5,371,867 | 12/1994 | George et al. | 395/406 |
| 5,463,589 | 10/1995 | Gruender, Jr. et al. | 365/230.01 |

FOREIGN PATENT DOCUMENTS

| | | |
|---|---|---|
| 0473802A1 | 3/1992 | European Pat. Off. . |
| 3841602A1 | 6/1989 | Germany . |
| 3019051 | 1/1991 | Japan . |
| 2256513 | 9/1992 | United Kingdom . |

OTHER PUBLICATIONS

"Maximize the Memory Usage when Using APL2", IBM Technical Disclosure Bulletin, vol. 32, No. 8B, Jan. 1990, pp. 317–318.

IBM Enterprise System/9000 Processor Resource IBM Enterprise System/3090 System Manager v. A05 1990.

*Primary Examiner*—Jack A. Lane
*Attorney, Agent, or Firm*—Antonelli, Terry, Stout & Kraus

[57] ABSTRACT

When virtual machines are activated under a condition in which an assignment request having a storage extent and a storage region origin is designated and an assignment request having only the storage extent designated are mixedly present, the logical partion (LPAR) whose storage origin is designated by flags is regarded as already assigned even when the storage region is not actually assigned, and a work table indicative of the current status of the storage assignment is generated in a not-in-use storage region table. The not-in-use storage region table is generated on the basis of the work table to determine the assignment or non-assignment of the LPAR to be activated, and assignment or non-assignment of a plurality of such not-in-use regions can be judged in an ascending order.

12 Claims, 6 Drawing Sheets

FIG. 1a
| LPAR NAME | STO | STE | STR |
|---|---|---|---|
| LPAR 1 | — | 16 | 0 |
| LPAR 2 | 16 | 24 | 8 |
| LPAR 3 | — | 16 | 0 |
(MB)
FIG. 1b
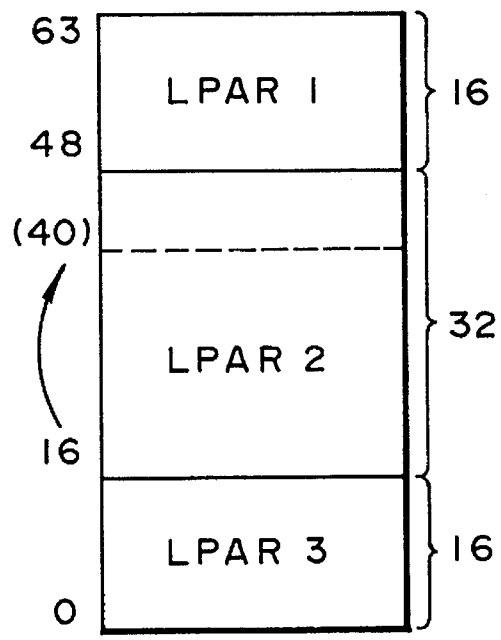
ADDRESS
FIG. 1c
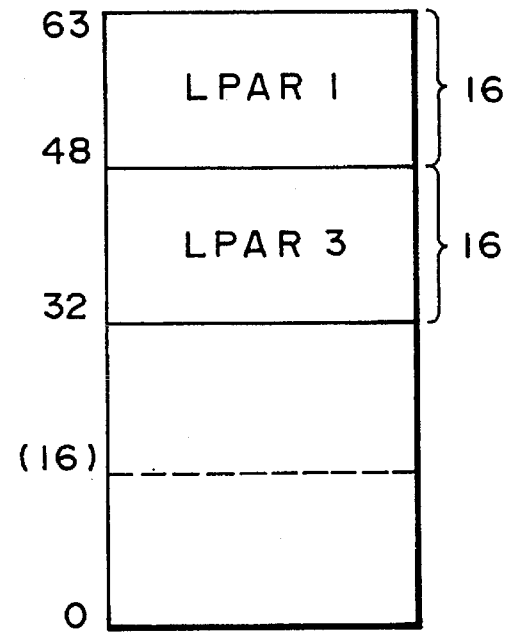
ADDRESS

FIG. 3a

STORAGE ASSIGNMENT
STATUS TABLE STRALCT

| STORAGE ASSIGNMENT STATUS FLAG ENTRY STRFLAG (STORAGE ORIGIN EFFECTIVITY FLAG STR#STOV, STORAGE REGION ACTIVATION FLAG STR#STOA) |
|---|
| STORAGE ORIGIN ENTRY STRSTO |
| INITIAL STORAGE ENTRY STRSTE |
| RESERVATION STORAGE RANGE ENTRY STRSTR |
| CURRENT STORAGE RANGE ENTRY STRSTC |

FIG. 3b

STORAGE ASSIGNMENT
WORK TABLE RMACTWK

| WORK FLAG ENTRY ACTFLAG (REGION IN-USE FLAG ACT#STRA) |
|---|
| WORK STORAGE ORIGIN ENTRY ACTSTO |
| WORK INITIAL STORAGE ENTRY ACTSTE |
| WORK CURRENT STORAGE RANGE ENTRY |

FIG. 3c

NOT-IN-USE STORAGE
REGION AREA TABLE RMRMDWK

| FLAG ENTRY RMDFLAG (EFFECTIVITY FLAG RMD#STRV) |
|---|
| ORIGIN ENTRY RMDSTO |
| RANGE ENTRY RMDSTE |

STORAGE REGION ASSIGNMENT METHOD IN A LOGICALLY PARTITIONED ENVIRONMENT

BACKGROUND OF THE INVENTION

The present invention relates to methods for assigning regions in a storage in a data processor and, more particularly, to a method for logically dividing a storage into a plurality of storage regions and for suitably assigning the divided storage regions to a plurality of virtual machines to realize a plurality of virtual machines with use of a data processor.

For the purpose of operating a plurality of operating systems (OSs) on a single data processor, in general, there is used a virtual machine (VM) or a system known as a logical partition (LPAR) system. In order to implement a plurality of virtual machines (VMs) on a single data processor, a program called a virtual machine control program (VMCP) is run on a real data processor to generate the plurality of VMs under control of the VMCP and to operate the OSs of the VMs independently on their VMs. Accordingly, the VMCP has an additional function of causing the VMs to sharedly use hardware resources of the single real data processor.

As a method for enabling the VMs to sharedly use the hardware resources of the single real data processor, it has been proposed to divide a real storage into logical regions which are exclusively assigned to the respective VMs.

FIG. 1a shows an example of parameters which are designated by an operator to divide a real storage into logical regions. More specifically, LPAR1, LPAR2 and LPAR3 designate logical partitions allocated to respective VMs to be operated. In FIG. 1a, a parameter STO is indicative of a storage origin, a parameter STE is indicative of an initial storage extent and a parameter STR is indicative of a reserved storage extent. These parameters can be designated respectively for the different LPARs. The parameter STO designates the start address of one of the regions of the actual storage assigned to the associated logical partition LPAR. When the parameter STO is not designated, an uppermost address (63 in FIG. 1b) of the storage regions which is not being used currently on the real storage is assigned to the start address under the program VMCP. The parameter STE designates the storage extent of the initial storage region to be assigned to the associated LPAR. The parameter STR designates the reserved storage extent to be assigned to the associated LPAR. The reserved storage region is assigned to the associated LPAR or is removed under control of storage-region on-line and off-line demand instructions issued from one of the OSs operated in the initial storage region.

Shown in FIGS. 1b and 1c are examples of the storage region assignment to the respective LPARs of the real storage, when the partitions LPAR1, LPAR2 and LPAR3 given by all such three sorts of predetermined parameters as shown in FIG. 1a are activated, respectively. In this case, to "activate" means that, with respect to either one of the LPARs given in FIG. 1a, the storage region of the associated VM or LPAR is put in its usable condition. More in detail, FIG. 1b shows an example in which the regions LPAR1, LPAR2 and LPAR3 are activated in this order and the storage regions are assigned to all the LPARs. Meanwhile, FIG. 1c shows an example in which the regions LPAR1, LPAR3 and LPAR2 are activated in this order. In the case of FIG. 1c, the LPAR1 and LPAR3 are successfully assigned and the STO is not assigned to both of the LPAR1 and LPAR3, so that the assigned storage regions are reserved in the upper part of the real storage as shown. Thereafter, when an attempt is made to activate the LPAR2, the STO is designated for the LPAR2, for which reason the system tries to secure a storage region starting with the STO. However, since part of the storage region to be secured is already assigned to the LPAR3, its activation ends in a failure.

As already explained above, according to the method for assigning the regions of the storage to the respective LPARs (VMs), successful or unsuccessful assignment depends on the activating order of the respective LPARs. This problem cannot be ignored from the viewpoint of improving the operability of the system. Further, the prior art assignment method has another problem in that, in spite of the fact that a remainder of the storage extent of the LPAR to be activated is present in the real storage, the remainder storage extent cannot be used.

SUMMARY OF THE INVENTION

It is an object of the present invention to provide a method for assigning the regions of a real storage which can solve the above problems in the prior art, can eliminate assignment of the storage regions dependent on the activation order, and can realize an improved operating efficiency in the real storage.

Another object of the present invention is to provide a method for effectively using a real storage, which can prevent such an assignment failure as mentioned above in connection with the prior art regardless of the order of assigning virtual machine storage regions to a real storage.

In accordance with an aspect of the present invention, the above objects are attained, when storage region assignment is carried out to activate an LPAR whose STO is not designated, by regarding the storage region of an LPAR whose STO is designated as already assigned (in use) even when the LPAR storage region is not actually assigned to a real storage yet and a remaining not-in-use assignment storage region is assigned to the LPAR.

In accordance with another aspect of the present invention, when the storage regions of the STE and STR of the LPAR whose STO is designated are regarded both as already assigned, an assignment failure causes the storage region assignment to be re-executed, for example, with the STR regarded as being not assigned yet.

In accordance with a storage region assignment method of the present invention, when LPAR1, LPAR3 and LPAR2 are activated in this order with use of such parameters as exemplified in FIG. 1a, the resultant storage region assignment status is as shown in FIG. 1b. That is, when LPAR1 is first activated, since the STO of this LPAR is not designated, the LPAR is assigned to the uppermost one of the not-in-use storage regions. When LPAR3 is next activated, since the STO of the LPAR is also not designated, the LPAR is assigned to the uppermost one of the not-in-use storage regions. In this case, however, the not-in-use real storage regions are other than the storage region already assigned to LPAR1 and a storage region to be used by LPAR2 having a designated STO. Accordingly, LPAR3 is assigned to the storage region which is directly below the storage region to be used by LPAR2. Next, when LPAR2 is activated, since the STO of LPAR2 is designated, LPAR2 is assigned to the storage region of the real storage starting with a position designated by the STO. This is because this region remains as a not-in-use region when LPAR3 is activated.

In this way, when the storage region assignment method of the present invention is applied, a success or failure in the activation of a LPAR having a designated STO becomes independent of the activating order of the respective LPARs, whereby the real main storage can be effectively used and the operability of the system can be also improved.

BRIEF DESCRIPTION OF THE DRAWINGS

FIG. 1a shows an example of parameters designated by an operator to divide a real storage into logical regions;

FIGS. 1b and 1c show examples of storage region assignment according to the present invention, respectively;

FIG. 3a shows a storage assignment status table (STRALCT);

FIG. 3b shows a storage assignment work table (RMACTWK);

FIG. 3c shows a remainder storage region area table (RMRMDWK);

DESCRIPTION OF THE PREFERRED EMBODIMENTS

A storage region assignment method in accordance with an embodiment of the present invention will be detailed with reference to the attached drawings.

Figure 2:
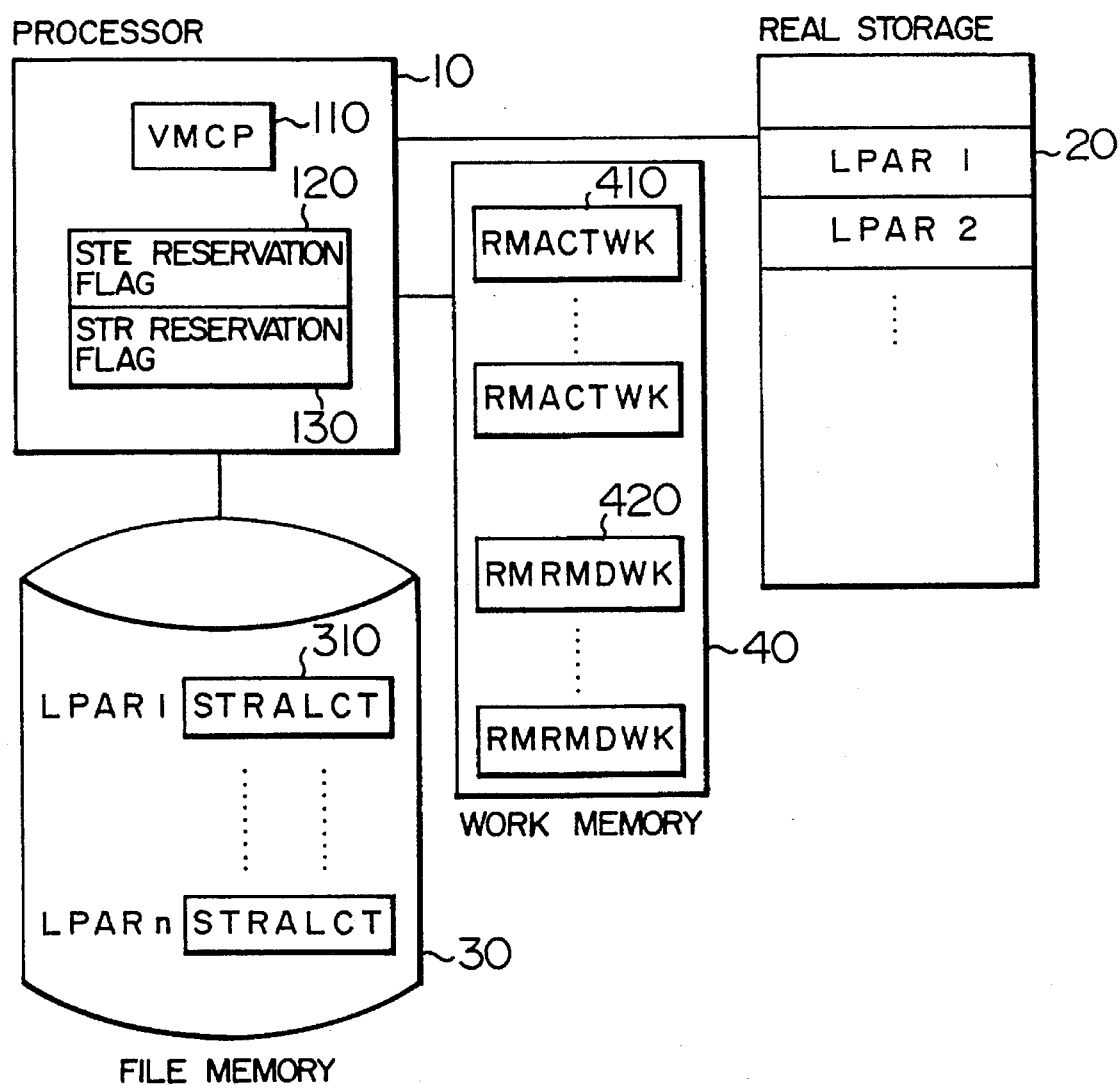
FIG. 2 shows a block diagram of an arrangement of a system in accordance with an embodiment of the present invention.

Referring first to FIG. 2, there is shown a block diagram of an arrangement of a system in accordance with an embodiment of the present invention. The system of FIG. 2 comprises a real data processor (CPU) 10, a real storage 20 to be assigned, a file memory 30, and a work memory 40. In more detail, the file memory 30 manages a storage assignment status table (which will be referred to as the STRALCT, hereinafter) holding therein the storage region assignment status of the real storage 20 in association with the respective LPARs of associated systems. The work memory 40 is used to temporarily hold a storage assignment work table (which will be referred to as the RMACTWK, hereinafter) 410 showing a current status of an assigned storage during assignment of the storage regions and a non-assigned storage region area table 420 (which will be referred to as the RMRMDWK, hereinafter) showing a current status of a not-in-use storage. In this connection, the memories 30 and 40 may use predetermined storage regions of the storage 20.

A virtual machine control program (VMCP) 110 is operated on the real data processor 10. Under control of the VMCP 110, a plurality of VMs or LPARs are generated and the respective LPARs are assigned to the storage regions of the real storage 20. In particular, the LPAR whose STO is not designated is activated, the VMCP 110 reads the respective STRALCT 310 of the file memory 30, generates the RMACTWK 410 and the RMRDWK 420 on the work memory 40, and determines whether or not assignment of the storage region of the associated LPAR is possible.

An STE reservation flag 120 and an STR reservation flag 130 indicate, during the assignment of the storage regions, whether or not the STE and STR of the SPAR whose STO is designated are regarded as assigned even when they are actually not assigned on the real storage 20 yet. These flags are set under control of the VMCP 110. Each of the STE and STR flags is set at "1" when regarded as assigned, and otherwise is set at "0". For example, the VMCP 110, when activating a LPAR not designated by a STO, first sets both of the STE reservation flag 120 and STR reservation flag 130 at "1" to execute the assignment of the storage regions. When ending in a failure, the VMCP 110 sets, for example, only the STE reservation flag 120 at "1" (that is, regards only the STE as already assigned) and retries the assignment of the storage regions.

Shown in FIG. 3a is a storage assignment status table (STRALCT) which is made up of a series of entries. More specifically, a storage assignment status entry (which will be referred to as the STRFLAG, hereinafter) has a storage origin effectivity flag (which will be referred to as the STR#STOV, hereinafter) and a storage region activation flag (which will be referred to as the STR#STOA, hereinafter). The flag STR#STOV indicates whether or not the STO is designated ("1" when designated and otherwise, "0"). The flag STR#STOA indicates whether or not the storage region of the VM or LPAR is assigned ("1" when assigned and otherwise, "0"). A storage assignment status storage-origin entry (which will be referred to as the STRSTO, hereainafter) indicates the storage origin (STO) of the LPAR when STR#STOV=1. Even when STR#STOV=0, if STR#STOA=1 then the origin of the storage region assigned to the LPAR is set in the STRSTO on the basis of the STO of the associated LPAR in FIG. 1a. A storage assignment status initial storage-range entry (which will be referred to as the STRSTR, hereinafter) indicates the initial storage range (STE) of the LPAR. A storage assignment status reservation storage-range entry (which will be referred to as the STR-STR, hereinafter) indicates the reservation storage range (STR) of the LPAR. A storage assignment status current-storage-range entry (which will be referred to as the STRSTC, hereinafter) may assign the STRSTE assigned to the LPAR as the STRSTC when STR#STOA=1. After completion of the activation, if the OS requires more storage area, the STRSTR+STRSTE is changed to the STRSTC so that a currently usable wider range can be displayed.

FIG. 3b shows a storage assignment work table (RMACTWK) which is made up of a series of entries. More specifically, a storage assignment work flag entry (which will be referred to as the ACTFLAG, hereinafter) has a storage region in-use flag (which will be referred to as the ACT#STRA, hereinafter). A storage assignment work storage-origin entry (which will be referred to as the ACTSTO, hereinafter) indicates the storage origin (STO) of the LPAR in use. A storage assignment work initial storage-range entry (which will be referred to as the ACTSTE, hereinafter) indicates the initial storage range (STE) of the LPAR in use. A storage assignment work current storage-range entry (which will be referred to as the ACTSTC, hereinafter) indicates the current storage range (STC) of the LPAR in use.

FIG. 3c shows a not-in-use (remainder) storage region area table (RMRMDWK) which is made up of a series of entries. More specifically, a not-in-use storage region area entry flag entry (which will be referred to as the RMD-FLAG, hereinafter) has a remainder storage region area effectivity flag (which will be referred to as the RMD#STRV, hereinafter). A remainder storage region area origin entry (which will be referred to as the RMDSTO, hereinafter) indicates the origin of the remainder storage region area of the LPAR. A remainder storage region area range entry (which will be referred to as the RMDSTE, hereinafter) indicates the range of the remainder storage region area of the LPAR.

Figure 4:
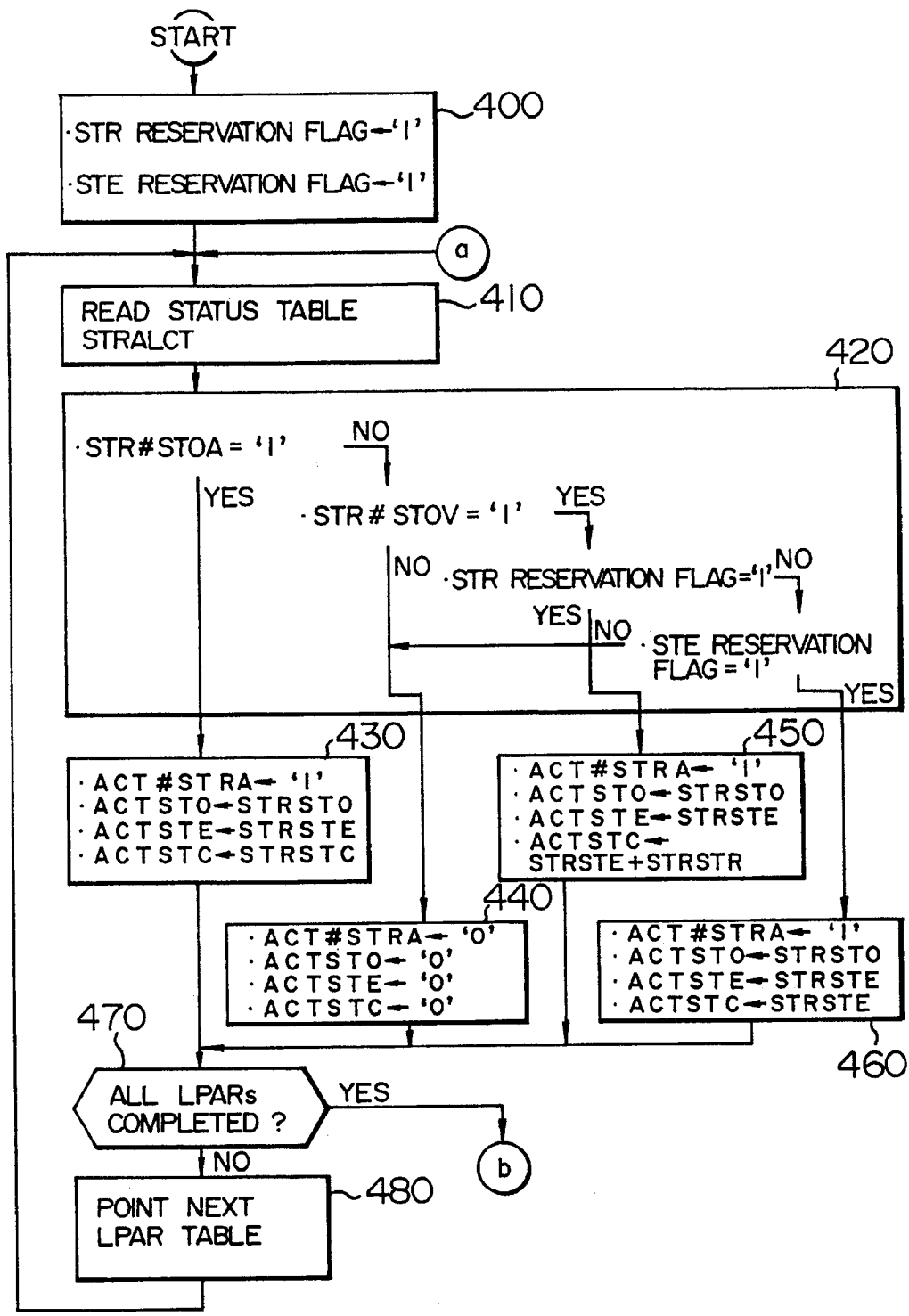
FIGS. 4 and 5 collectively show a flowchart for explaining an example of the procedure of a storage region assignment method in accordance with the present invention.
Figure 5:
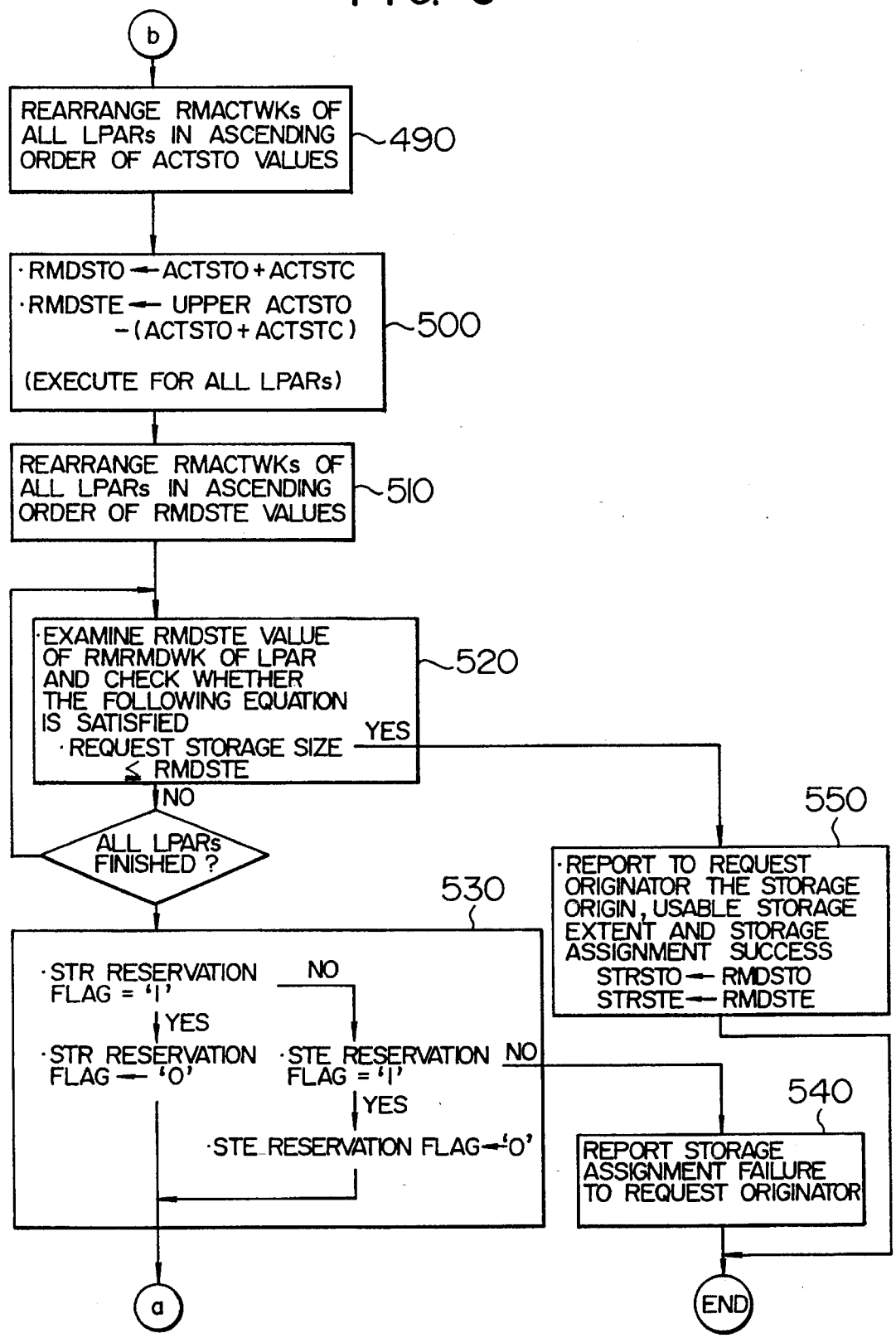

FIGS. 4 and 5 shows a flowchart for explaining the processing procedure of a storage region assignment method in accordance with an embodiment of the present invention. This processing is carried out by the VMCP 110. Explanation will be made as to the procedure of how a LPAR having a STO which is not designated and a LPAR having a STO which is designated, when an LPAR is activated, are assigned to the storage regions, by referring to FIGS. 3a to 3c. The processing of FIGS. 4 and 5 is executed for the activation of each LPAR.

Step 400

First, the STR flag and STE reservation flags are both set at "1". This means that, even when the STR and STE of the LPAR with the designated STO are both not actually assigned to the real storage, the STR and STE are regarded (reserved) as already assigned, i.e., as in-use storage regions.

Step 410

This step is for reading out the STRALCT (see FIG. 3a) from the file memory 30. The STRALCT of the heading LPAR is first read out, followed by the table STRALCT of the LPAR pointed to in a step 480. In steps 410 to 460, the status table STRALCT (see FIG. 3a) for all predetermined LPARs is repeated according to the decision of a decision step 470.

Step 420

In this step, the storage assignment work table RMACTWK is generated in the work memory 40 according to the STR and STE reservation flags and the conditions of the STRFLAG (STR#STOV and STR#STOA) of the associated STRALCT to select one of the subsequent steps 430 to 460 for setting of the contents of the respective entries. In more detail, the processings of the step 420 are:

(1) When the STR#STOA is "1", the program goes to the step 430.
(2) If the STR#STOA is "0" and the STR#STOV is "0", then the program goes to the step 440.
(3) If the STR#STOA is "0", the STR#STOV is "1" and the STR reservation flag is "1", then the program goes to the step 450.
(4) If the STR#STOA is "0", the STR#STOV is "1", the STR reservation flag is "0", and the STE reservation flag is "1", then the program goes to the step 460. Since this case takes place when the STR reservation flag is changed in a step 530 from "1" to "0" for re-assignment of the storage regions, this does not occur in the first processing.
(5) If the STR#STOA is "0", the STR#STOV is "1", the STR reservation flag is "0", and the STE reservation flag is "0", then the program goes to the step 440. As in the case (4), this case occurs only when the storage regions are re-assigned.

Step 430

This case occurs when the associated LPAR is active and its storage region is already assigned. Thus, the ACT#STRA of the generated storage region in-use flag RMACTWK is set at "1" to set the contents of the STRSTO, STRSTE and STRSTC of the STRALCT read in the step 410 respectively in the ACTSTO, ACTST and ACTSTC.

Step 440

This step occurs when the corresponding LPAR is not active yet and the STO is not designated or when the STO is designated and the STR and STE region reservation is not made yet. In this case, the ACT#STRA of the generated RMACTWK is set at "0" and the ACTSTO, ACTSTE and ACTSTC are all set at "0" or to a value sufficiently smaller than the size of the memory region to be assigned. Thereafter, the program goes to the step 470.

Step 450

This is a case in which the corresponding LPAR is not active yet, the STO is designated and the region of the STR is also reserved. That is, the ACT#STRA of the generated RMACTWK is set at "1" (that is, regarded as already assigned) to set the contents of the STRSTO, STRSTE and STRSTE+STRSTR of the STRALCT respectively in the ACTSTO, ACTSTE and ACTSTC. That is, the region of the STE+STR (FIG. 1a) starting with the STO is regarded as already assigned. Thereafter, the program goes to the step 470.

Step 460

This is when the corresponding LPAR is not active yet but the STO is designated and only the STE region reservation is made. The ACT#STRA of the generated RMACTWK is set at "1" (that is, regarded as already assigned) to set the contents of the STRSTO, STRSTE and STRSTE+STRSTR of the STRALCT respectively in the ACTSTO, ACTSTE and ACTSTC. That is, the region of the STE starting with the STO is regarded as already assigned. Thereafter, the program goes to the step 470.

Step 470

In this step, judgement is made as to whether or not the processings of the steps 420 to 460 were applied to all predetermined LPARs of the respective systems. If the application is not completed, then the program goes to a step 480; while if the application is completed, then the program goes to a step 490.

Step 480

In this step, the table corresponding to the next LPAR in the file memory 30 is pointed to and the program is returned to the step 410.

Step 490

With respect to the respective RMACTWKs generated in the work memory 40 for all the LPARs of the respective systems, the contents of the ACTSTOs of the RMACTWKs having a corresponding ACT#STRA of "1" are examined to re-arrange the RMACTWKs in the ascending order of contents in the ACTSTOs. Thereafter, the program proceeds to a step 500.

Step 500

Figure 6:
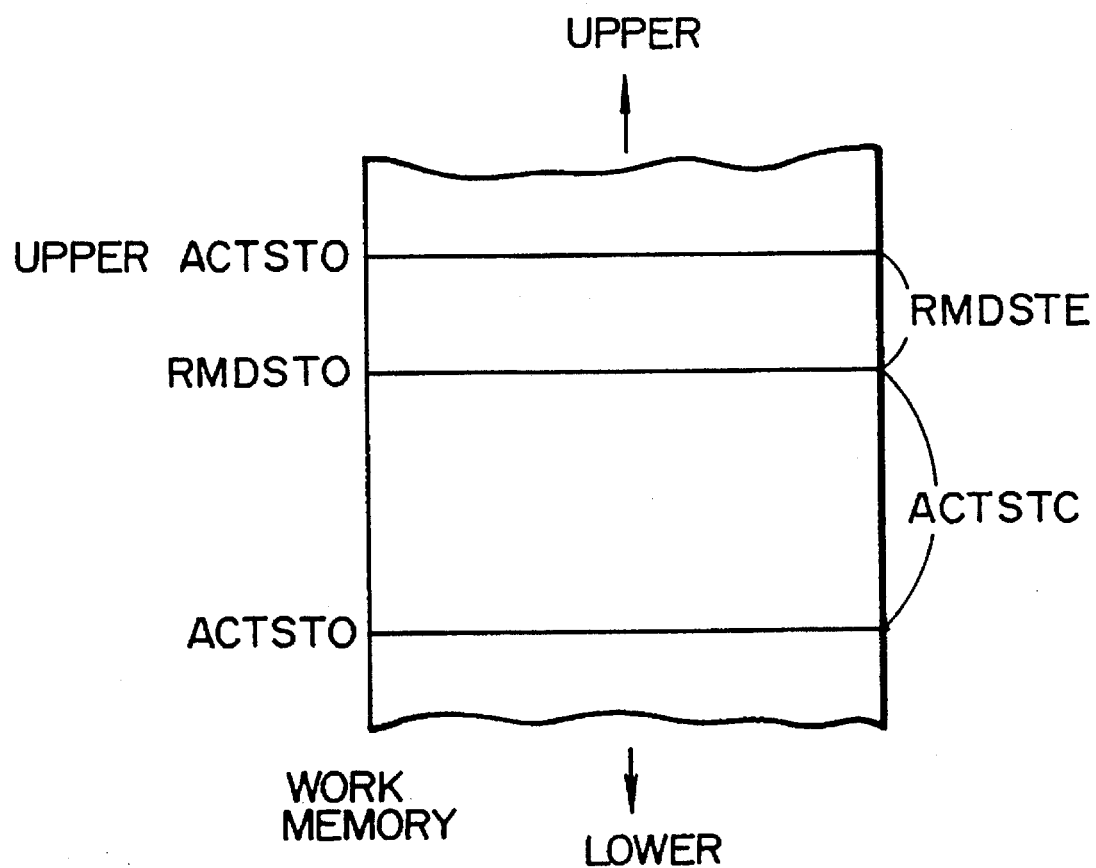
FIG. 6 is a diagram for explaining a relationship between an in-use storage region and a not-in-use storage region in a real storage.

In this step, the origin and storage extent of a not-in-use storage region are found on the basis of the contents of the respective entries of the RMACTWKs generated for all the LPARs of the respective systems to generate the respective not-in-use storate region area tables RMRMDWKs. The results of the ACTSTO+ACTSTCs are set in the RMDSTOs of the RMRMDWKs in the ACTSTO ascending order, the ACTSTO+ACTSTC is subtracted from the ACTSTO of the RMACTWK at one-entry upper side, and the subtraction result is set in the RMDSTE. The number of not-in-use storage regions corresponds at most to the number of all LPARs added by 1. Thereafter, the program goes to a step 510. FIG. 6 shows relationships between the ACTSTO and RMDSTO and between the ACTSTC and RMDSTE.

Step 510

In this step, with respect to the respective RMRMDWKs generated in the work memory 40 for all the LPARs of the respective systems, the contents of the RMDSTEs of the RMRMDWKs having a corresponding RMD#STR of "1" are examined and the RMRMDWKs are re-arranged in the ascending order of contents in the RMDSTEs. Thereafter, the program goes to a step 520.

Step 520

In this step, with respect to all the LPARs of the respective systems, the contents of the RMDSTEs of the RMRMD-WKs having a corresponding RMD#STRV of "1" are examined in the ascending order of the contents of the RMDSTEs to judge whether the contents of the RMDSTE are not smaller than the assignment storage extent of the LPAR to be currently activated. If the contents of the RMDSTE are not smaller than the assignment storage extent of the LPAR, then the program goes to a step 550; whereas, if the RMDSTE contents are smaller than the assignment storage extent, then the next smaller RMDSTE is examined for judgment. When examination of all the LPARs which have been rearranged results in the absence of a next smaller RMDSTE, the program goes to step 350.

Step 530

In this step, on the basis of the state of the STR and STE reservation flags, (a) the values of the STR and STE reservation flags are updated and the program returns to the step 410 to retry the storage region assigning operation, or (b) when the STR and STE reservation flags cannot be updated anymore, the program goes to a step 540. More in detail, the processings of this step are:

(1) If the STR reservation flag is "1", then this flag is set at "0" and the program returns to the step 410.

(2) If the STR reservation flag is "0" and STE reservation flag is "1", then the STE reservation flag is set at "0" and the program returns to the step 410.

(3) If the STR reservation flag is "0" and the STE reservation flag is also "0", then the program goes to the step 540.

Step 540

This step is executed when a remainder storage region which is not smaller than the assignment storage extent of the LPAR to be activated is absent, whereby the failure of the storage region assignment is reported to the request originator.

Step 550

This step is executed when a remainder storage region which is not smaller than the assignment storage extent of the LPAR to be activated is present, whereby the success of the storage region assignment together with the values of the reserved RMDSTO and RMDSTE are reported to the request originator. The request originator, with use of the reported values of the reserved RMDSTO and RMDSTE, assigns the storage region of the associated LPAR to a range between the RMDSTO+RMDSTE and RMDSTO and registers the STRALCT corresponding to the LPAR in the file memory 30.

In the foregoing explanation, the reserved storage range entry STRSTR, the current storage range entry STRSTC and the work current storage range entry ACTSTC may be omitted, resulting in a simple arrangement in some systems.

The values of the RMDSTO and RMDSTE of the assigned region are set in the entries STRSTO and STRSTE of the STRALCT of the associated LPAR as shown in FIG. 3a.

When another LPAR is activated, the processing of FIGS. 4 and 5 is again executed so that the STO and STE of the status table STRALCT already subjected to region assignment cause the data RMDSTO and RMDSTE indicative of an empty region to be changed in the step 500 of FIG. 5, with the result that the assignment of the LPAR will not be overlapped with the already assigned region. Thus, an assignment independent of the activating sequence can be achieved with the result that a possibility of failure in the storage region assignment can be reduced, the operability of the system can be improved, and the operating efficiency of the real storage can be increased.

When the judgment of the processings (1) and (2) in the step 530 results in the program returning to the step 410, the addition of STRSTE+STRSTC in the step 450 is not carried out or the region reservation itself in the step 460 is removed, so that the remainder region expressed in terms of the RMDSTO and RMDSTE in the step 500 can be expanded. In other words, this means that regarding the not-in-use storage region for a virtual machine whose storage origin is designated as the in-use storage region is relieved in a stepwise manner, whereby logical division of the storage can be realized with a higher flexibility.

What is claimed is:

1. In a data processor having a storage and a processor, a method of assigning a plurality of regions of said storage to a plurality of virtual machines according to a plurality of activating or non-activating storage region assignment requests, comprising the steps of:

(a) preparing, on the basis of said plurality of storage assignment requests each indicative of assignment of at least a storage extent of a storage origin, a reservation storage extent, and the storage extent in the storage regions, a parameter table holding therein the storage origins and the storage extents;

(b) generating, on the basis of said parameter table, a storage assignment table holding therein said storage origin and said storage extent;

(c) setting, on the basis of the storage activating assignment request, an activation flag in said storage assignment table;

(d) setting, on the basis of the designation of the storage origin and the nonactivating storage region assignment request, said activation flag in said storage assignment table to generate a plurality of assignment work tables each having an activation storage origin and an activation storage extent which are the same as said storage origin and said storage extent, wherein a decision is made that, on the basis of the non-activating storage region assignment request, the activation flag is not set in said storage assignment table and zeros are set for the activation storage origin and activation storage extent of said assignment work tables;

(e) arranging said plurality of assignment work tables in an ascending order of said storage origins;

(f) generating, on the basis of data of said plurality of assignment work tables, a plurality of remainder work tables each containing a remainder storage origin and a remainder storage extent indicative of a non-assignment region, in said storage origin ascending order;

(g) rearranging said plurality of remainder work tables in an ascending order of said remainder storage extents in said plurality of remainder work tables;

(h) determining in said remainder storage extent ascending order, whether or not a request storage size contained in the storage assignment request does not exceed said remainder storage extents of said plurality of remainder work tables; and (i) when it is determined that said request storage size does not exceed said remainder storage extents of said plurality of remainder work tables, copying said remainder storage origin and said remainder storage extent in said storage origin and said storage extent of said storage assignment table, respectively.

2. A method as set forth in claim 1, further comprising the steps of preparing a reservation flag to be set according to said storage assignment requests, and, when it is determined that said request storage size exceeds all of said remainder storage extents of said plurality of remainder work tables, resetting said reservation flag, and wherein the steps (b), (c) and (d) relating to all the predetermined virtual machines according to said storage assignment request relating to one of said virtual machines are repeated.

3. A method as set forth in claim 2, further comprising a step of, when said reservation flag is reset, increasing a non-used region of said storage.

4. A method as set forth in claim 1, further comprising a step of preparing a reservation flag to be set according to said storage assignment request, a step, when it is determined that said request storage size exceeds all of said remainder storage extents of said plurality of remainder work tables, of resetting said reservation flag and repeating said steps (b), (c) and (d), and a step, when said reservation flag is set, of generating in said storage assignment table a current storage extent corresponding to an addition of said reservation storage extent contained in either one of said plurality of storage assignment requests and said storage extent.

5. A method as set forth in claim 4, further comprising a step of, when it is determined that said request storage size exceeds all of said remainder storage extents of said plurality of remainder work tables, checking whether or not said reservation flag is reset, and a step of, when said reservation flag is reset in said checking step, reporting a storage assignment failure to an originator of the storage assignment request.

6. A method as set forth in claim 1, wherein, when said storage assignment request does not contain a designation of said storage origin, a storage region is assigned to an upper address in a not-in-use region.

7. In a data processor having a storage and a processor, a method of assigning a plurality of regions of said storage to a plurality of virtual machines according to a plurality of activating or non-activating storage region assignment requests, comprising the steps of:

(a) on the basis of said plurality of storage assignment requests each indicative of assignment of at least a storage extent of a storage origin, the storage extent and a reserved extent in the storage regions, preparing a plurality of parameter tables each holding therein the storage origins, the storage extents and the reserved extent;

(b) setting a first reservation flag and a second reservation flag;

(c) generating, on the basis of said parameter table, a storage assignment table holding therein said storage origin, said storage extent and said reserved extent;

(d) setting, on the basis of the storage activating assignment request, an activation flag in said storage assignment table;

(e) on the basis of the designation of the storage origin and the non-activating storage region assignment request, setting said activation flag in said storage assignment table to generate a plurality of assignment work tables each having an activation storage origin, an activation storage extent and an activation reserve extent;

(f) according to contents of said first and second reservation flags, generating in said storage assignment table a current extent entry in which one of a zero, said reserved extent and a sum of said reserved extent and said storage extent is copied wherein a decision is made, on the basis of the non-activating storage region assignment request, that the activation flag is not to be set in said storage assignment table and zeros are to be set for the activation storage origin and activation storage extent of said assignment work table;

(g) arranging said plurality of assignment work tables in an ascending order of said storage origins;

(h) generating, on the basis of data of said plurality of assignment work tables, a plurality of remainder work tables, each containing a remainder storage origin and a remainder storage extent indicative of a non-assignment region, in said storage origin ascending order;

(i) rearranging said plurality of remainder work tables in an ascending order of said remainder storage extents in said plurality of remainder work tables;

(j) determining in said remainder storage extent ascending order, whether or not a request storage size contained in the storage assignment request does not exceed said remainder storage extents of said plurality of remainder work tables;

(k) when it is determined that said request storage size does not exceed said remainder storage extents of said plurality of remainder work tables, copying said remainder storage origin and said storage extent of said storage assignment table, respectively; and (l) when it is determined that said request storage size exceeds all of said remainder storage extents of said plurality of remainder work tables, selectively resetting said first and second reservation flags.

8. A method as set forth in claim 7, further comprising a step, when it is determined that said request storage size exceeds all of said remainder storage extents of said plurality of remainder work tables, of checking whether or not said first and second reservation flags are both reset, and a step, when both of said reservation flags are reset in said checking step, of reporting a storage assignment failure to an originator of the storage assignment request.

9. A method as set forth in claim 7, wherein, when said storage assignment request contains a designation of said storage origin, assignment is carried out in a storage region above said storage origin; while, when the storage assignment request does not contain the designation of the storage origin, a storage region is assigned to an upper address in a not-in-use region.

10. A method as set forth in claim 7, further comprising a step, when it is determined that said request storage size exceeds all of said remainder storage extents of said plurality of remainder work tables, of resetting said reservation flag, and wherein said steps (c), (d) and (e) relating to all the predetermined virtual machines according to said storage assignment request relating to one of said virtual machines are repeated.

11. A method as set forth in claim 7, further comprising the step, when said reservation flag is reset, of increasing a non-used region of said storage.

12. In a data processor having a storage and a processor, a method of assigning a plurality of regions of said storage to a plurality of virtual machines according to a plurality of activating or non-activating storage region assignment requests, comprising the steps of:

(a) preparing, on the basis of said plurality of storage assignment requests each indicative of assignment of at least a storage extent of a storage origin, a reservation storage extent, and the storage extent in the storage regions, a parameter table holding therein the storage origins and the storage extents;

(b) generating, on the basis of said parameter table, a storage assignment table holding therein said storage origin and said storage extent;

(c) setting, on the basis of the storage activating assignment request, an activation flag in said storage assignment table;

(d) setting, on the basis of the designation of the storage origin and the nonactivating storage region assignment request, said activation flag in said storage assignment table to generate a plurality of assignment work tables each having an activation storage origin and an activation storage extent which are the same as said storage origin and said storage extent;

(e) arranging said plurality of assignment work tables in an ascending order of said storage origins;

(f) generating, on the basis of data of said plurality of assignment work tables, a plurality of remainder work tables each containing a remainder storage origin and a remainder storage extent indicative of a non-assignment region, in said storage origin ascending order;

(g) rearranging said plurality of remainder work tables in an ascending order of said remainder storage extents in said plurality of remainder work tables;

(h) determining, in said remainder storage extent ascending order, whether or not a request storage size contained in the storage assignment request does not exceed said remainder storage extents of said plurality of remainder work tables; and (i) when it is determined that said request storage size does not exceed said remainder storage extents of said plurality of remainder work tables, copying said remainder storage origin and said remainder storage extent in said storage origin and said storage extent of said storage assignment table, respectively.

* * * * *